UNITED STATES PATENT OFFICE.

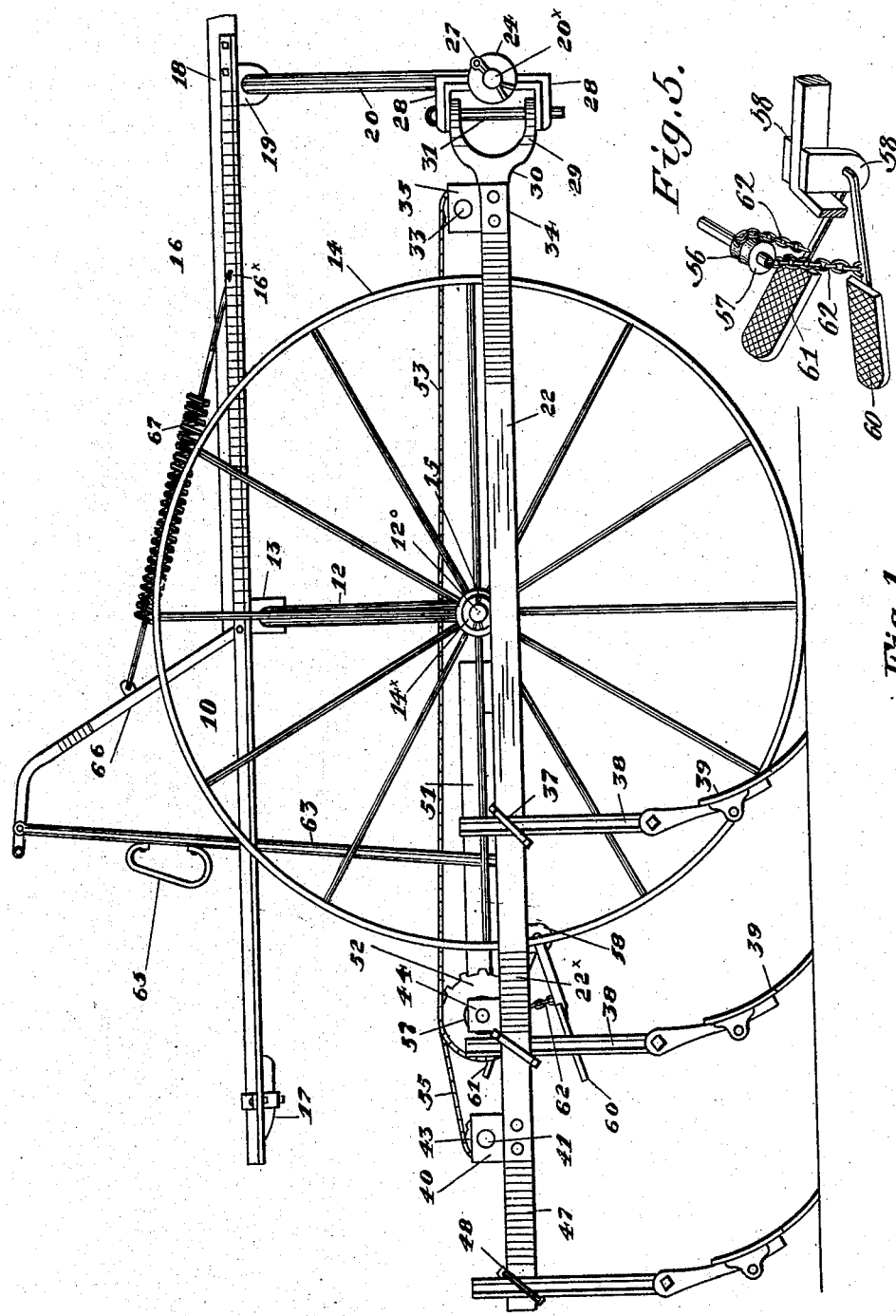

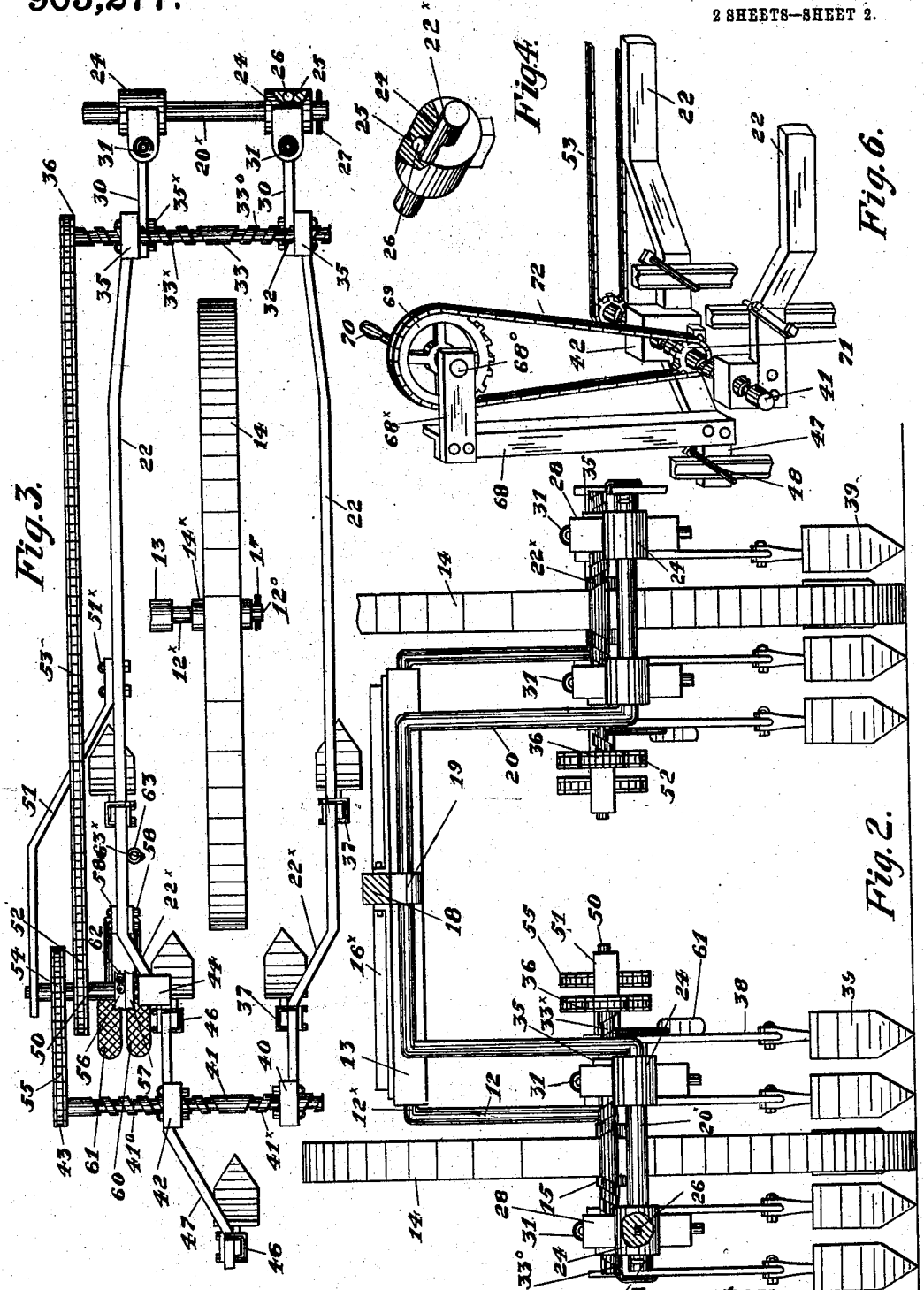

JOHN BEARD, OF PAOLA, KANSAS.

CULTIVATOR.

No. 905,277.   Specification of Letters Patent.   Patented Dec. 1, 1908.

Application filed May 19, 1908. Serial No. 433,672.

*To all whom it may concern:*

Be it known that I, JOHN BEARD, a citizen of the United States of America, residing at Paola, in the county of Miami and State of Kansas, have invented certain new and useful Improvements in Cultivators; and I do hereby declare that the following is a full, clear, and exact description of the invention, such as will enable others to make and use the same, reference being had to the accompanying drawings, forming a part of this specification.

The object of the invention is to enable the cultivator plows or shovels on the gangs to adapt themselves to the irregularities and variance in the width of the rows of a planted field, so as to cultivate the spaces between the rows without disturbing the plants. The invention consists in the novel construction and combination of parts, such as will be first fully described and specifically pointed out in the claims.

In the drawings: Figure 1 is a side view of a wheeled cultivator, embodying the invention. Fig. 2. is a front view, showing the invention applied to the separate gang supporting beams. Fig. 3. is a plan view of the gang beam on either side of the wheels of the cultivator. Fig. 4. is a detail, broken view of one of the movable bearings on the arms of the yoke supporting the separate beams, showing the anti-friction roller. Fig. 5, is a view in detail of the foot operated mechanism. Fig. 6. is an isometric view of the rear end of the adjustable beams, showing a modification.

Similar numerals of reference indicate corresponding parts in all the figures of the drawings.

Referring to the drawings, 10 indicates a two-row, high wheeled cultivator, in which the shovel supporting gangs are supported forward of the wheels. The frame of the cultivator consists of an arched axle 12, formed of a round bar, the upper portion $12^x$, being horizontal and of the requisite height for the tongue of the cultivator, as further described. Upon this portion $12^x$, of the yoke, is secured rigidly a beam 13, the said portion of the yoke extending longitudinally therethrough. The ends 12°, of the arched axle, extend outwardly in opposite directions, a considerable distance. Upon these ends 12°, of the axle, are the wheels 14, of the cultivator, which pass through the hubs $14^x$, and are secured by the cotters 15.

To the upper surface of the beam 13 is secured a frame 16, of the ordinary description, consisting of longitudinally extended bars $16^x$, connected rigidly with the beam 13, the forward ends of which bars extend the requisite distance forwardly to support the cultivator gangs or beams, at an advanced point relative to the wheels 14, and the rear ends extend a corresponding distance rearwardly and at their rear ends is a fixed seat 17, for the driver. With this beam 13 is also connected the rear end of the tongue 18, the forward end extending forwardly the requisite distance, the forward ends of the bars 16 being connected with the said tongue in the usual manner.

With the lower surface and forward ends of the tongue 16 are connected the hanger 19, in which is a front arch 20, comprising a round rod extending through said hangers, the ends being bent downwardly to a point in line horizontally with the axis of the wheels 14, and the extreme ends $20^x$ bent at right angles and extended outwardly in opposite directions and to a considerable distance for the purpose hereinafter described.

22 indicate the gang beams, upon the respective sides of the wheels 14, to which the invention is particularly applied. The construction of the beams 22, or the gangs, are the same upon the respective sides of the cultivator and the description of the co-operating mechanism for one side is adapted precisely for the other, and which is illustrated in Fig. 3.

Upon the horizontal ends $20^x$, of the front arch 20, on frame 16, are mounted the separate sliding, annular bearings or boxes 24. In order to insure the ready movement of these bearings in the outer portion of the bearings are recesses 25, in which are loosely arranged the anti-friction balls 26. At the extremity of the ends $20^x$, of the suspensory device 20 are cotters 27.

With the upper and lower surfaces of the bearings or boxes 24, are connected rigidly the perforate inner end of bars 28, within which extend a forked extension 29, of the gang supporting flat bars 30, and through which bars and said forked extensions extends the vertical pivot bolts 31, which forms a knuckle joint.

In the rear ends of the flat bars 30, are perforations 32, and in which perforations is mounted the gang connecting adjusting shaft 33, of slightly smaller circumference. As seen in the drawings, the shaft is of considerable length, and in one end of the shaft is the right hand screw threads 33×, and upon the other end the left hand screw threads 33°. Upon the forward ends of the gang beams 22, are bolted firmly the plates 34, with the upper portion of which plates are connected the boxes 35, which boxes are bolted to the bars 30, and these bars are provided with right and left hand screw threads, respectively, and which boxes are fitted to the respective threaded portions 33× and 33°, of the connecting shaft 33. Upon the inner end of the screw shaft 33 is a sprocket wheel 36. In the construction shown, the inner beam 22 is considerably longer than the outer beam, and both bent inwardly at 22×. Upon the rear portion of the gang beams 22 and outer surfaces are the usual staples 37, in which are mounted the upper ends of the standards 38, of the gangs of plows or shovels, the shovels 39 being connected with the lower end of the bars in the usual manner, it being observed that the weight of the rear ends of the beams 22 assist to keep the plows or shovels in the ground. Upon the rear portion of the outer beam 22 is a box 40, which is provided with a left hand screw thread, in like manner as the bearing or box 35, at the forward end of said beam, in which box is inserted the left hand screw-threaded portion 41×, of a connecting shaft 41, upon the inner end of which shaft are the right-hand screw threads 41°, which portion of the shaft extends through a box 42, which box is secured rigidly to the upper surface of the beam 22, in a transverse direction to the box 40. Upon the inner end of the connecting shaft 41 is a small sprocket wheel 43. Upon the upper surface of the portion 22×, of the inner beam 22 is secured fixedly a journal box 44.

The rear end of the inner beam 22, which as heretofore stated, is longer than the outer beam, is bent inwardly at an angle to the portion 22×, as seen at 47, and upon said end of the beam is a staple 46, and upon the rear surface of the box 42 is a like staple, in which are supported the plow-supporting standards and plows, as heretofore described, the position of the standard and plow on the angular portion 47, of the rear end of the inner beam 22, being in rear of wheel 14. In the journal box 44 is journaled one end of a rotary shaft 50, the inner end of which shaft is journaled in a bearing connected with the rear end of bar 51, which bar is horizontally in line with the journal box 44, as seen in Fig. 1, the forward ends of which bar extend forwardly a short distance, corresponding with the beam 22, and then bent inwardly and a portion extended downwardly and secured rigidly to the outer surface of said bar by the bolts 51×. Upon the shaft 50, intermediate its ends is a large sprocket wheel 52, over which extends an endless sprocket chain 53, which chain extends forwardly, and over the sprocket wheel 36, on the forward connecting shaft 33.

Upon shaft 50, toward the support 51, is a sprocket wheel 54, of the same circumference as wheel 52, over which wheel 54 extends an endless sprocket chain 55, which chain extends rearwardly over the sprocket wheel 43, on the rear connecting shaft 41.

In order to communicate reciprocal movement to the connecting shaft 41, upon the shaft 50, adjacent to the box 44, are fixed the separate grooved wheels 56 and 57. With the opposite sides and rear ends of beam 22 immediately forward of the portion 22× are secured the hangers 58, in which are pivoted the forward ends of the foot pedals 60 and 61. With these foot pedals are connected separate belts or chains 62, one of which is connected with the upper portion of wheel 56 and the other with the lower, grooved portion of wheel 57.

For the purpose of raising and lowering the rear ends of the gang beams 22 and the cultivator plows or shovels, with the sides of the inner beams 22, of the gang beams, are pivotally connected at 63×, the lower ends of the rods 63, the upper end of which rods extend upwardly a considerable distance above the frame 16, of the cultivator, and which upper ends of which rods are pivotally connected with the rearwardly bent upper ends of the fulcrum posts 66, which posts are pivotally connected at their lower ends with the bars 16×, of frame 16, with which fulcrum posts are connected the rear ends of spiral springs 67, their forward ends being connected with the forward ends of the bars 16×, in the usual manner.

In the operation of the cultivator, the drawing power is applied to the tongue 18, connected with the frame 16, of the cultivator, the cultivator being arranged in position at the beginning of the rows of the short corn or other plants.

The position of the gang frames being elevated, the rods 63 are drawn rearwardly by the handles, as shown, at 65, and the plows or shovel supporting beams 22, upon the respective sides of the wheels 14, move downwardly, their rear ends permitting the shovels to bear upon the ground.

In order to aline the cultivator plows or shovels with the respective rows, the operator from his position on the seat 17 places his feet upon the pedals 60 and 61, and bearing alternately upon said pedals communicates rotary motion to the shaft 50, and from said shaft to the sprocket chains 53 and sprocket wheels 52, to the sprocket wheel 36, on the forward adjusting shaft 33, and also through the sprocket wheels 54 and chains 55, to the sprocket wheels 43, on the rear adjusting shaft 41, and in which rotary movement of both adjusting shafts a rectilinear or traverse movement is communicated to the beams 22, and the beams are moved outwardly or inwardly, or traverse as the shovels are moved the requisite distance and transverse to the longitudinal direction or alinement of the rows, when the operation of the pedals ceases.

If in the progressive movement of the cultivator shovels the rows upon alinement with either gang of shovels become narrowed in width or irregular, the feet of the operator applied to the pedals 60 and 61 will reverse the direction of rotation of the adjusting shaft, and the beams 22 are moved reciprocally inwardly and outwardly, in conformation with the variance in the direction of the rows, whether narrow or wide, as the case may be, and these movements may be upon one side of the cultivator, or both, the movements requiring the shifting of the foot from one pedal to the other, as the movements may be necessitated. In this manner the ground may be cultivated between the rows long distances, avoiding obstructions in the path of the cultivator at a moment's observation, and enabling the ground to be fully removed of the weeds between the rows, without disturbing the plants. The dead weight is upon the bearings 24, upon the suspensory device 20, and in the reciprocal movements of the beams 22 the anti-friction rollers 26 assist in the free working of the gangs inwardly and outwardly, upon the surfaces of the portions 22ˣ, and the pivot bolts 31 permit the movements inwardly of the boxes 35, and also outwardly, without binding.

Instead of the employment of foot pedals to operate the adjusting shafts 33 and 41, I may employ the hand power devices as seen in Fig. 5. In this construction the shaft 50, sprocket wheels 52 and 54, and the support 51, for the shaft, are dispensed with, and the sprocket chain 53 connected with the sprocket wheel 36, on the forward adjusting shaft 33, extended in length and to and over the sprocket wheel 43, on the rear adjusting shaft 41. With the rectangular bar 47, connected with the box 40, and at a point near the outer end of said bar is connected the lower end of an angle bar 68, the upper end of which bar extends upwardly the proper height to be in reach of the operator. With the upper end and inner surface of said angle bar is connected the rear end of a short flat bar 68ˣ, which extends forwardly a short distance and upon which is a stud shaft 68°, and upon said shaft is a sprocket wheel 69, with the outer, peripheral portion of which is connected a handle 70. Upon the adjusting shaft 41 is a small sprocket wheel 71, which chain extends upwardly over the sprocket wheel 69.

The handles 70, upon the wheels 69, on the respective sides of the cultivator, are, it is observable, within reach of the hands of the operator, and the transverse movement of the beams carrying the cultivator shovels are readily moved in position to meet the variance in the width of the rows, as previously described, the movement of the wheel 69 transmitting power through the sprocket chain 72 to the sprocket wheel 71, on the adjusting shaft 41, from which power is transmitted to the forward adjusting shaft through the sprocket chain 53 as before.

I have shown the invention applied to a two-row cultivator, for convenience. Its application may be made as an attachment to various kinds of cultivators, and therefore I do not limit its application to any one of the many kinds in use. The connecting shafts may be connected with the upper or lower portions of the gang frame, as preferred, and the screw threads reversed. The adjustment of the gangs instead of working at both ends may be worked at one end without the other, and I do not confine myself to the particular adjusting devices, as various other adjusting devices may be utilized, and such other modifications employed as are within the scope of the claims.

Having fully described my invention, what I now claim as new and desire to secure by Letters Patent is:

1. In a cultivator the combination with the coöperating plow supporting beams, of forward and rear adjusting connecting shafts, having right and left-hand screw threads, and bearings upon the said beams through which the said shafts extend.

2. In a cultivator the combination with coöperating plow supporting beams, and the bearings at the ends of said beams, of an adjusting beam connecting shaft in said bearings, having right and left-hand screw threads, an independent driven shaft and manually operated mechanism for imparting motion from said shaft to the said beam adjusting and connecting shaft.

3. In a cultivator the combination with coöperating plow supporting beams, and bearings upon the ends of said beams, and with forward and rear rotary adjusting shafts connecting said beams having right and left-hand screw threads within said bearings, of means communicating rotary motion from one of said adjusting shafts to the other, an independent driven shaft and manually operated mechanism for imparting motion from said shaft to one of said beam adjusting and connecting shafts.

4. In a cultivator the combination with coöperating plow-supporting beams, and bearings upon the ends of said beams, of adjusting shafts connecting said beams within said bearings, having right and left hand screw threads, a rotary shaft supported by said beams, driving means on one of said beam adjusting shafts communicating rotary motion to the other shaft, an independent rotary shaft in driving connection with one of said beam adjusting shafts, and foot operated mechanism upon said independent shaft acting to impart movement to said shaft in one direction of rotation and also in a reverse direction.

5. In a cultivator the combination with coöperating plow supporting beams, and bearings at the ends of said beams, of forward and rear adjusting shafts connecting said beams within said bearings having right and left hand screw threads, an independent shaft journaled on said beams and sprocket wheels on said shaft and the rear adjusting shaft a sprocket chain extending from one of said sprocket wheels to the other grooved wheels on said independent shaft, hangers connected with said beams, foot pedals having their forward ends pivotally connected with said hangers and chains connected with said foot pedals one of which chains is connected with the upper portion of one of said grooved wheels, and the other chain with the lower portion of the other grooved wheel.

JOHN BEARD.

Witnesses:
 HARRY L. GREEN,
 BEN. E. TODD.